US009188679B2

(12) United States Patent
Hamada (10) Patent No.: US 9,188,679 B2
(45) Date of Patent: Nov. 17, 2015

(54) ELECTRONIC APPARATUS AND POWER SUPPLY CONTROL PROGRAM FOR POSITION MEASURING

(75) Inventor: Youichi Hamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 718 days.

(21) Appl. No.: 12/441,284

(22) PCT Filed: Sep. 11, 2007

(86) PCT No.: PCT/JP2007/067683
§ 371 (c)(1),
(2), (4) Date: Mar. 13, 2009

(87) PCT Pub. No.: WO2008/044416
PCT Pub. Date: Apr. 17, 2008

(65) Prior Publication Data
US 2010/0088028 A1  Apr. 8, 2010

(30) Foreign Application Priority Data
Oct. 10, 2006  (JP) .................................. 2006-276359

(51) Int. Cl.
*G01S 19/34* (2010.01)
*H04W 52/02* (2009.01)

(52) U.S. Cl.
CPC ........... *G01S 19/34* (2013.01); *H04W 52/0225* (2013.01); *H04W 52/0254* (2013.01); *Y02B 60/50* (2013.01)

(58) Field of Classification Search
USPC .................. 342/35.747; 340/539.13; 455/574
See application file for complete search history.

(56) References Cited

U.S. PATENT DOCUMENTS

| 6,501,420 B2* | 12/2002 | Townsend et al. ........ 342/357.74 |
| 2001/0012451 A1* | 8/2001 | Ohkado ........................ 396/310 |
| 2004/0203879 A1 | 10/2004 | Gardner et al. |

(Continued)

FOREIGN PATENT DOCUMENTS

| CN | 1363045 A | 8/2002 |
| EP | 1 043 599 A2 | 10/2000 |
| JP | 1992351981 A | 12/1992 |

(Continued)

OTHER PUBLICATIONS

English Translation of JP 04-351981 to Moji.*

(Continued)

*Primary Examiner* — Anita Coupe (57) ABSTRACT

There is obtained a communication terminal and a position measuring power source control program capable of reducing power consumption associated with position measurement in relation to use of a position measuring system by a user. A CPU 101 of an arithmetic processing module 102 activates, when a position measurement processing module 105 conducts position measurement by use of a position measuring antenna 106, a particular application program to implement, for example, a navigation system. The CPU 101 assumes that the user has no intention to use the particular application program, when the user closes a folding-type cellular 100 to turn a folding detection switch on, thereby the CPU 101 activates a timer 108, and terminates the position measurement processing after a lapse of a predetermined period of time; and a power supplying module 112 suspends supply of power to the position measurement processing module 105.

8 Claims, 5 Drawing Sheets

(56) References Cited

U.S. PATENT DOCUMENTS

2005/0124316 A1 6/2005 Islam et al.
2008/0301554 A1* 12/2008 Ishidera et al. ............... 715/700

FOREIGN PATENT DOCUMENTS

| JP | 1994088867 A | 3/1994 |
| JP | 6-148305 A | 5/1994 |
| JP | 1995294273 A | 11/1995 |
| JP | 1997312608 A | 12/1997 |
| JP | 2000352519 A | 12/2000 |
| JP | 2003166826 A | 6/2003 |
| JP | 2005217817 A | 8/2005 |
| JP | 2005236924 A | 9/2005 |
| JP | 2006074582 A | 3/2006 |
| JP | 2006153695 A | 6/2006 |
| WO | 01/63317 A1 | 8/2001 |

OTHER PUBLICATIONS

International Search Report for PCT/JP2007/067683 mailed Oct. 16, 2007.
Japanese Office Action for JP2008-538599 issued Nov. 1, 2011.
Chinese Office Action for 200780037933.6 issued on Mar. 1, 2012.
Search report issued in counterpart EPO (European Patent Office) patent application, 07807092.7, dated Apr. 2, 2012.
The Extended European Search Report of EP Application No. 14158541.4 dated Aug. 21, 2014.

* cited by examiner

FIG. 5 ered state or in a stopped state, the power may be supplied to the GPS receiver circuit. Similarly, the battery is also unnecessarily consumed in the stopped state.

ELECTRONIC APPARATUS AND POWER SUPPLY CONTROL PROGRAM FOR POSITION MEASURING

TECHNICAL FIELD

The present invention relates to an electronic apparatus having a position measuring function and a power supply control program for position measuring, and in particular, to an electronic apparatus such as a cellular and a portable measuring device in which consumption power for position measurement is reduced and a power supply control program for position measuring.

RELATED ART

Position measuring systems employing the Global Positioning System (GPS) are widely adopted not only for ships and airplanes, but also for various electronic apparatuses including a cellular, a Personal Handy-phone System (PHS), a Personal Digital Assistant (PDA), a portable position measuring device for mountaineering and walking, a car navigation system, and a personal computer. For example, when a position measuring system is adopted in a cellular, the user can easily make the cellular display information on restaurants near the cellular and an entrance of a subway. Also, photos of landscapes or the like shot by a camera attached to the cellular can be easily mapped onto a map by using time when the photos are shot and the longitude and latitude of the shooting position.

However, in order to utilize the GPS function for such electronic apparatuses, it is required to receive radio waves from a plurality of satellites moving around the earth; alternatively, to further increase position measuring precision, it is necessary to receive a correction signal from a terrestrial station. Hence, during the GPS function is being used, it is required for the associated electric apparatus to keep the communication function in an operative state. Therefore, particularly for a portable electric apparatus whose power source or supply relies on a battery, there exists a problem that the use of the GPS function for a long period of time results in exhaustion of the battery in a short period of time.

To cope therewith, there has been made a first proposal in which power supply to the GPS receiver circuit is suspended during a period of time to conduct a call by the cellular and is resumed when the call is terminated (e.g., see, Patent Document 1). According to the first proposal, since when the communication due to the inherent call of the cellular overlaps in time with the reception by the GPS, the consumption power becomes greater and the battery is abruptly consumed; in consideration thereof, life of the battery is elongated by suspending the supply of power to the GPS receiver circuit during the call.

However, when the holder of the cellular is using a transport facility such as a car, the position changes during a call moment by moment. Hence, there arises a problem that the current position cannot be attained if the call continues a long period of time. Also, although the GPS receiver circuit is powered after the termination of the call, the position cannot be measured immediately after the GPS receiver circuit is powered, but a period of time of, for example, one minute (initial measuring time) is required. Therefore, even if the call is finished in a short period of time, the position measurement cannot be conducted until the initial measuring time lapses.

On the other hand, there has been made a second proposal in which when a mobile object such as a car is stopped, if this state continues for at least a predetermined period of time, e.g., 20 minutes, the power supply to the GPS receiver circuit is suspended (for example, see, Patent Document 2). According to the second proposal, the power supply to the GPS receiver circuit is suspended because the current position is not changed during the object is in the state if the operation of the mobile object is stopped. Furthermore, even when the car stops due to a traffic signal or congestion, it is not assumed that the car is kept stopped for a long period of time, e.g., 20 minutes. Hence, if the car stops such long period of time, it is assumed that the operation of the mobile object such as a car is quite likely to be kept stopped for a long period of time; hence, thereafter, the power supply to the GPS receiver circuit is suspended.

However, according to the second proposal, the supply of power to the GPS receiver circuit is suspended on condition that the operation of the mobile object is in the stopped state for a relatively long period of time, e.g., 20 minutes or 30 minutes. Therefore, the communication by the GPS continues for a relatively long period of time after the operation of the mobile object is stopped, which leads to a problem that power is still wastefully consumed to a large extent.

Similarly, there exists a third proposal in which vibration of the apparatus itself is detected, and if the vibration is not detected for a predetermined period of time, the power supply to the GPS receiver circuit is interrupted (e.g., see, Patent Document 3). In the preceding second proposal, if the engine of the mobile object is running, there may exist a case wherein it cannot be assumed that the operation is stopped; however, in accordance with the third proposal, if the engine is stopped and the vibration is also stopped, it is possible to stop the supply of power after a lapse of a predetermined period of time.

Patent Document 1: Japanese Patent Application Laid-Open Publication No. 9-312606 (paragraph 0008; FIG. 3)
Patent Document 2: Japanese Patent Application Laid-Open Publication No. 7-294273 (paragraph 0022; FIG. 4)
Patent Document 3: Japanese Patent Application Laid-Open Publication No. 2000-352519 (paragraph 0025; FIG. 1)

DISCLOSURE OF THE INVENTION

Problem to be Solved by the Invention

The second and third proposals described above are useful when applied mainly to transport facilities such as cars and streetcars. Most communication terminals such as cellulars are not directly related to operation itself. Also, the communication terminal primarily includes electronic parts. Hence, there exist a few apparatuses in which a mechanical vibration always takes place in operation thereof. Therefore, for such communication terminals, the power saving advantage cannot be increased by use of the technique to be applied mainly to the transport facilities.

Naturally, the specification of the third proposal also discloses a technique in which the supply of power to the GPS receiver circuit is suspended when the own position is in a stopped state for at least a predetermined period of time. This is because the current position does not change when the own position is in a stopped state as above, and it is hence not required to accomplish the position measurement.

However, many communication terminals are employed, due to developed functions, for a plurality of different purposes such as a call, communication of e-mails, and internet browsing, and hence the position measurement is not necessarily adopted as a function with a highest priority or as an essential function. Therefore, for example, even in a situation wherein the user of the communication terminal is in a moving transport facility and the current position is changing moment by moment, there exists a case in which the position measuring function is not required or a case in which the user is indifferent to the result of the position measurement. For example, when the user does not activate an application program which utilizes the position measuring function, the supply of power to the GPS receiver circuit is fully useless even if the electronic device has the position measuring function.

It is therefore an object of the present invention to provide an electronic apparatus and a power supply control program for position measuring capable of reducing power consumption associated with position measurement in relation to use of a position measuring system by a user.

Means for Solving the Problem

In the invention according to claim 1, an electronic apparatus includes (1) a position measuring unit that at least receives signals transmitted from a plurality of satellites moving around the earth and thereby measures a receiving position, (2) a particular application program operation control unit that controls operation of a particular application program which conducts predetermined processing by use of a result of the position measurement of the position measuring unit, (3) a power supplying unit that supplies power for the processing of the position measurement to the position measuring unit, (4) a particular application program use presence or absence judge unit that judges presence or absence of use of the particular application program by a user, and (5) a power supply control unit that suspends supply of power from the power supplying unit to the position measuring unit, when the particular application program use presence or absence judge unit judges absence of the use by the user, That is, the present invention relates to an electronic apparatus capable of executing a particular application program which conducts particular processing by use of a result of the position measurement of the position measuring unit; when executing the particular application program by use of the position measurement result, the power supplying unit supplies power for the position measurement processing to the position measuring unit. For example, the power supplying unit supplies power which is necessary to receive radio waves for the position measurement from communication satellites, to the position measuring unit. In this connection, it is assumed in the present invention that presence or absence of use of the particular application program by a user is judged by using the particular application program use presence or absence judge unit. For example, when the cellular is a folding-type cellular, absence of the use by the user is judged if the first and second housings coupled via the hinge mechanism with each other are closed. The power supply control unit suspends supply of power from the power supplying unit to the position measuring unit, when the particular application program use presence or absence judge unit judges absence of the use by the user. As above, when the system enters a state in which the user does not use the particular application program, the supply of power to the position measuring unit is suspended regardless of whether or not the predetermined time lapses; hence, it is possible to reduce the power consumption associated with the position measurement processing.

Judgment of presence or absence of use of the particular application program by a user may be carried out in other than this way. It may be conducted, for example, in a situation wherein the display module is covered when not being employed for display of an electronic apparatus including a cover to cover the display; or, when the particular application program is not normally executed.

In the invention according to claim 7, it is characterized that a computer of an electronic apparatus which includes a position measuring unit that at least receives signals transmitted from a plurality of satellites moving around the earth and thereby measures a receiving position and which executes a particular application program by use of a result of the position measurement of the position measuring unit to thereby conduct predetermined processing executes, as a power supply control program for position measuring, (1) particular application program use presence or absence judge processing of judging presence or absence of use of the particular application program by a user and (2) power supply control processing of suspending supply of power to the position measuring unit, when the particular application program use presence or absence judge unit judges absence of the use by the user.

That is, in the present invention, when the particular application program use presence or absence judge processing of judging presence or absence of use of the particular application program by a user is executed and if the absence of the use by the user is judged, the supply of power to the position measuring unit is suspended. The supply of power to the position measuring unit may be immediately suspended when the absence of the use by the user is judged; in order that the supply of power to the position measuring unit is carried out for at least the predetermined period of time from the point of time, there may be arranged a reserved period of time to be lapsed by when the supply of power is suspended.

Advantages of the Invention

As described above, in accordance with the present invention, in a situation wherein it is determined that activation of the particular application program is resultantly not required even if the user does not conduct direct processing, e.g., to stop supply of power to the position measuring unit or to terminate use of the particular application program which uses the processing result of the position measuring unit, the supply of power to the position measuring unit is suspended; hence, also in a case wherein the user forgets a concrete operation to stop the position measurement, the power consumption of the electronic apparatus can be lowered. Naturally, even when the absence of the use by the user is judged, if there is disposed, by use of a timer, a reserved period of time to be lapsed by when the supply of power to the position measuring unit is suspended, it is possible to continue the power supply to the position measuring unit according to, for example, an action of the user during the period of time, and interruption of the processing of the position measurement can be avoided. Furthermore, this makes the wait time unnecessary when the position measurement is to be again conducted, the wait time being lapsed by when the position measurement is initiated.

BEST MODE FOR CARRYING OUT THE INVENTION

Figure 1:
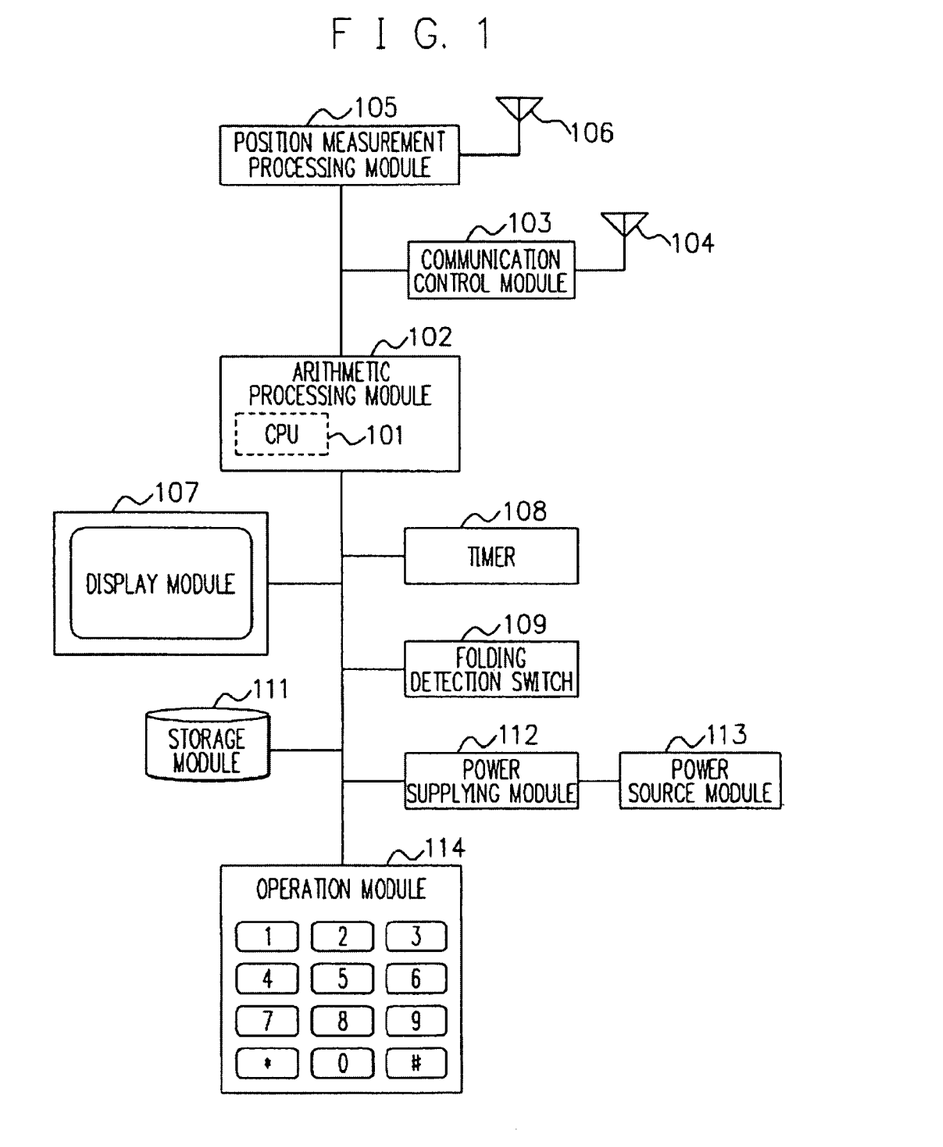
FIG. 1 is a general configuration diagram showing an outline of the circuit configuration of a cellular as an electronic apparatus in an exemplary embodiment of the present invention.

The present invention will be next described in detail according to exemplary embodiments.
First Exemplary Embodiment FIG. 1 shows an outline of structure of a cellular as an electronic apparatus according to an exemplary embodiment of the present invention. The cellular 100 includes an arithmetic processing module 102 including a Central Processing Unit (CPU) 101 to entirely control the apparatus. The module 102 is connected to respective modules of the apparatus. Of these modules, a communication control module 103 includes a communication antenna 104 to conduct communication with a base station, not shown, which makes it possible to carry out a call, communication of an e-mail, and access to the internet. A position measurement processing module 105 includes a position measuring antenna 106 and receives an ephemeris which is transmitted from each of a plurality of satellites, not shown, and which is correct orbit information of the satellite and an almanac as rough orbit information of all satellites to conduct position measurement. Depending on position measuring precision, the position measuring antenna 106 may receive a correction signal from a terrestrial station, not shown, to correct a result of the position measurement using GPS (Global Positioning System).

A display module 107 includes a liquid-crystal display or an organic display to display visual information such as letters and images.

A timer 108 is a circuit to measure a predetermined period of time, but may be implemented by counting operation clocks of the CPU 101 or clocks obtained by appropriately dividing the operation clock by means of software. A folding detection switch 109 is a sensor to detect a situation of the cellular 101 when the cellular 101 is folded. Such sensor may be constructed using any one of various sensors, for example, a mechanical sensor such as a microswitch; an optical sensor, and a magnetic sensor.

A storage 111 includes a storing medium such as a Random Access Memory (RAM), a Read Only Memory (ROM), or a magnetic disk. The storage 111 keeps therein a control program to be executed by the CPU 101; and memory areas such as work memory areas to temporarily store data necessary to execute the control program are allocated to the storage 111. Map data received by the communication controller 103 is also stored in a predetermined area of the storage 111. The control program which the CPU 101 executes includes also an application program for the position measuring processing module 105 to execute tracking processing.

A power supplying module 112 is coupled with a power source module 113 including a secondary battery and controls supply of power to particular parts such as the position measurement processing module 105 to thereby save the consumption power. An operation module 114 includes a dial key and various key switches such as a function key, not shown. A touch panel, not shown, may be arranged on the display 107.

In the cellular 100 of the present embodiment as above, the position measurement processing module 105 generates information of the longitude and the latitude of the current position on the basis of radio wave information of communication satellites, not shown, received via the position measuring antenna 106. The module 105 is capable of executing tracking processing to continuously carry out the position measuring operation. The arithmetic processing module 104 receives as an input thereto the position measurement data obtained by the position measurement processing module 105 and calculates the current position on the map data received via the communication controller 103 from the antenna 104. And, the module 102 delivers display data as a result of the calculation to the display 107 to display the data thereon as well as stores the map data and the position measurement data in the storage 111. The display 107 plays a role of an interface when the user operates the operation module 114.

The timer 108 is arranged to measure a period of time lapsed from when the measurement is set to a suspended state, for example, when the user terminates use of the cellular 100 and folds it or when the user starts using a function such as a call other than the measurement. And, after a lapse of a predetermined period of time, the timer 108 makes the system stop processing for the position measurement. When the user makes, before the lapse of the predetermined period of time, a predetermined action which is likely to lead to a chance to use a result of the measurement such as when the user opens the folded cellular 100, the time measuring operation of the timer 108 is to be reset.

Figure 2:
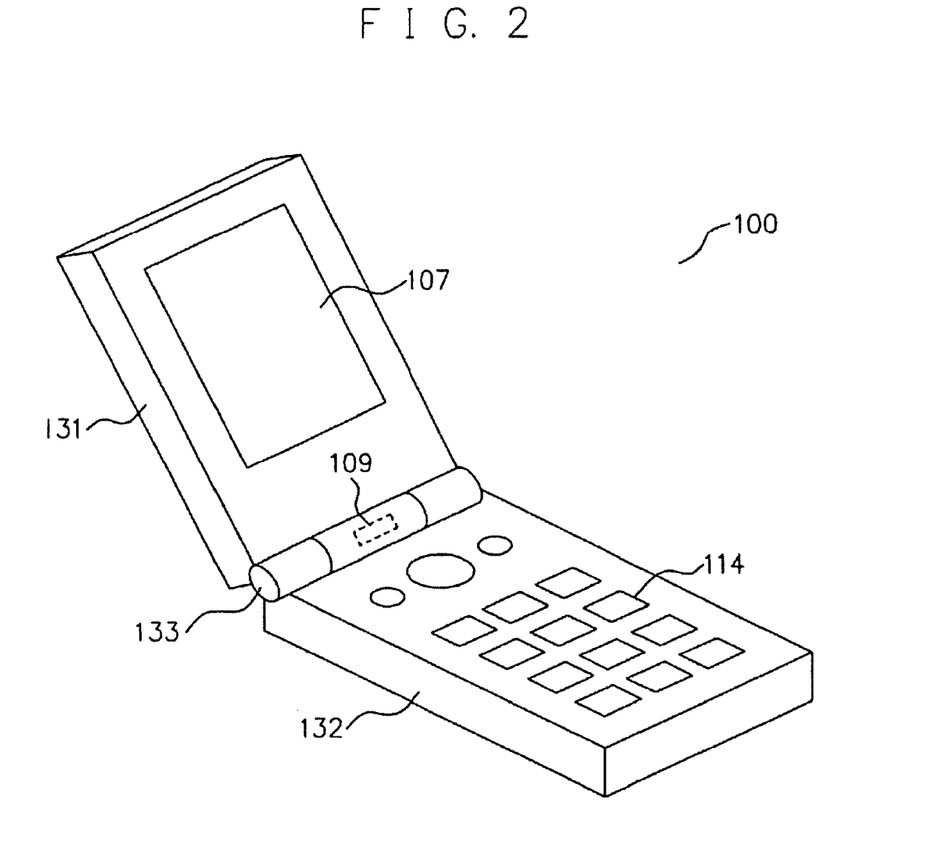
FIG. 2 is a perspective view showing an appearance of the cellular of the exemplary embodiment.

FIG. 2 shows an outer appearance of a cellular of the present embodiment. The cellular 100 is constructed such that a first housing 131 and a second housing 132 are foldable using a hinge mechanism 133. In the first housing 131, a display module 107 is disposed; in the second housing 132, an operation module 114 is disposed. In the hinge mechanism 133, a folding detector switch 109 is disposed to judge presence or absence of the folding by use of a rotary angle.

Figure 3:
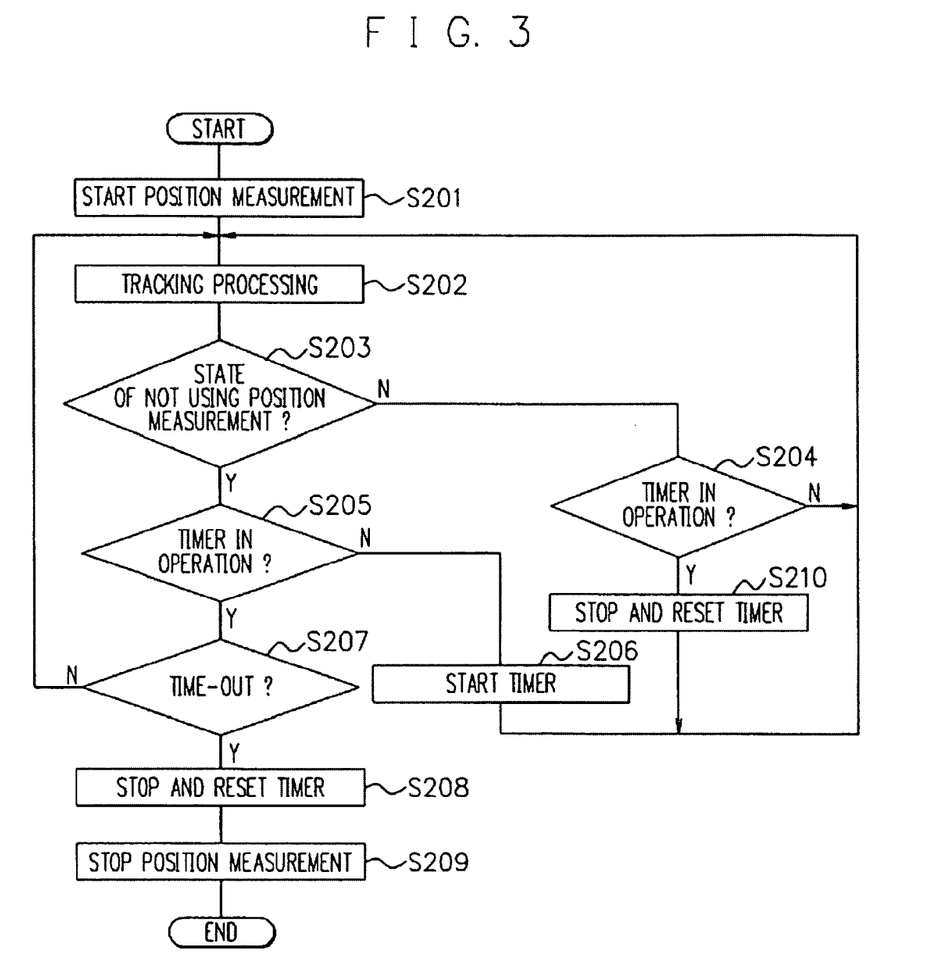
FIG. 3 is a flowchart of processing of the cellular when an application program of a navigation system is activated in the exemplary embodiment.

FIG. 3 shows a flow of processing of the cellular when an application program of a navigation system is activated. Description will be given referring also to FIG. 1. When the user conducts a predetermined operation from the operation module 114 to activate the application program of the navigation system, the CPU 101 instructs the power supplying module 112 to supply power to the position measurement processing module 105 and instructs the module 105 to start tracking processing to carry out the position measurement at a constant interval of time (step S201). This makes the module 105 execute the tracking processing (step S202).

In this state, the CPU 101 judges whether the cellular 100 is in a state in which the cellular 100 does not use the position measurement result attained by the tracking processing (step S203). The state in which the cellular 100 does not use the position measurement result indicates a case corresponding to either one of, for example, the following states.

(1) The folding detection switch has detected the folding of the cellular 100.

(2) The system has detected occurrence of failure in the application program to execute the tracking processing, the failure preventing use of the position measurement result.

(3) The user has instructed suspension or termination of execution of the application program to conduct the tracking processing.

In none of the cases, namely, when continuation of the tracking processing is being scheduled (N), the CPU 101 checks to determine whether or not the timer 108 is measuring time (step S204). And, if the timer 108 is not measuring time (N), the CPU 101 returns to step S202 to continue the tracking processing.

Assume, for example, that the user folds the cellular 101 at a certain point of time. As a result, the contents displayed on the display module 107 become invisible. Hence, it is known that the user indicates his or her intention not to view the position measurement result at least for a while. Then, when the CPU 101 detects a state in which the position measurement result is not used as above (Y in step S203), a check is made to determine whether or not the timer 108 is measuring time (step S205); if the timer 108 is not measuring time (N), the timer 108 starts measuring time (step S206). And, control returns to step S202, and the tracking processing is continuously executed until the timer 108 completes the time measuring operation (N in step S207).

If the timer 108 is in operation (Y in step 5205) and the timer 108 completes the time measuring operation (Y in step S207), the operation is suspended and the result of the time measurement is reset (step S208); the CPU 101 stops the position measurement of the position measurement processing module 105 and instructs the power supplying module 112 to suspend supply of power to the processing module 105 (step S209).

On the other hand, after the tracking processing is executed (step S202), when the system does not judge a state in which the cellular 100 does not use the position measurement result (N in step S203), if the timer 108 is measuring time (Y in step S204), the system suspends the time measurement and the result thereof is reset (step S210), and then control returns to the processing of step S202. This is, for example, a case wherein although the user folds the cellular 100, the user regards the operation as an error and then restores the original opened state to make the display module 107 visible.

As above, according to the present embodiment, when the system enters a state in which the user does not use the position measurement result (Y in step S203), the timer 108 activates its operation to continue the execution of the tracking processing for a predetermined period of time. And, meanwhile, if the system returns to a state in which the position measurement result is utilized, the time measuring operation of the timer 108 is stopped and the time measured up to this point of time is reset to zero. Hence, if the state to use the position measurement result is restored before the timer 108 completes the time measurement, the tracking processing can be executed without waiting for a lapse of the initial position measuring time (Time to First Fix (TTFF)) which is required, when the position measurement is completely suspended, before the measurement becomes again possible.

Naturally, in a situation wherein the system is in a state in which the user does not use the position measurement result and the timer 108 has measured the predetermined period of time, the supply of power to the position measurement processing module 105 is suspended even if the user does not terminate the application program of the navigation system. This consequently further enhances the power saving of the cellular 100.

In addition to the exemplary embodiment described above, the user beforehand registers, to the cellular 100, the contents of actions which is determined that the application program is not used, and the activation processing of the timer 108 is similarly executed when it is assumed that the user has no intention to use the position measurement according to the content of registration. For example, an acceleration sensor and a sensor to detect a posture are installed in the cellular 100 to make the power supplying module 112 conduct control such that if a state in which the user keeps the display module 107 facing downward continues for a fixed period of time, it is assumed that the user has no intention to view the display of the position measurement and hence power supply to the position measurement processing module 105 is suspended and/or a backlight (not shown) of the display 107 is turned off.

Also, for a cellular 100 which interrupts or suspends processing of the position measurement in association with, for example, processing performance if a second application program is activated in a state in which the application program of the navigation system is in the activated state, the system may control, in cooperation therewith, on/off of power supply to the position measurement processing module 105.

<First Variation of the Invention>

Figure 4:
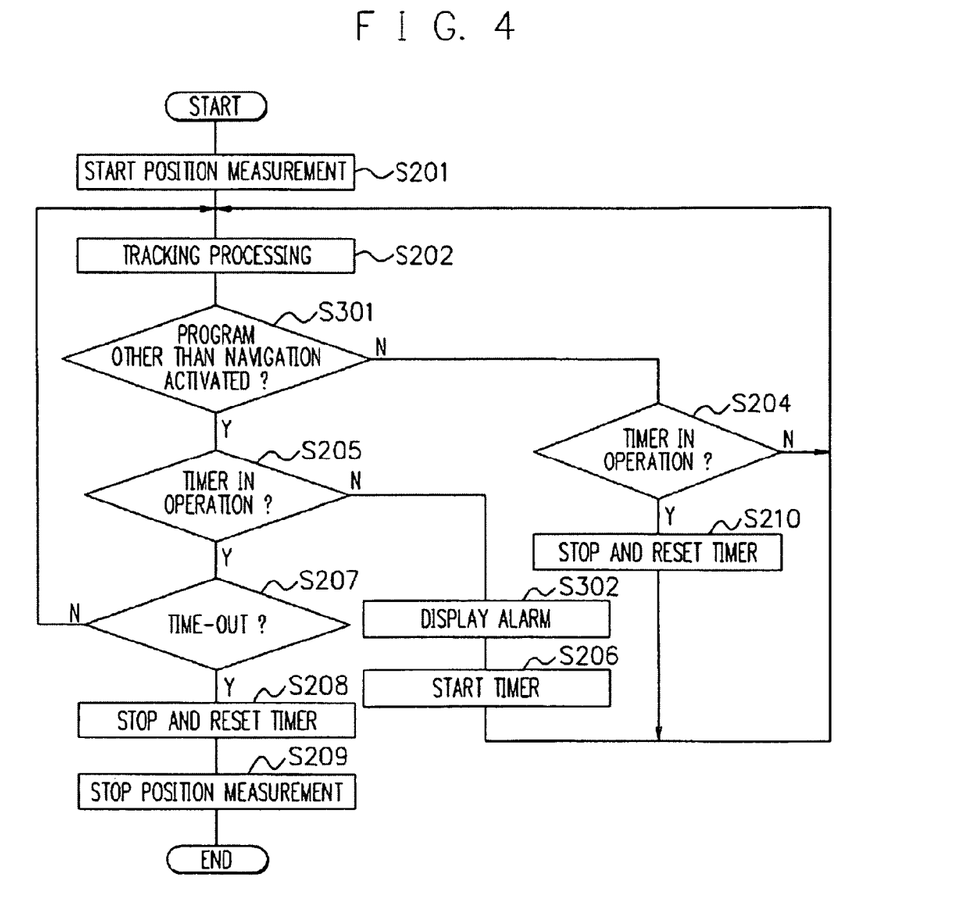
FIG. 4 is a flowchart of processing of the cellular when an application program of a navigation system is activated in a first variation of the present invention.

FIG. 4 shows a flow of processing of the cellular when an application program of the navigation system is activated in the first variation. Description will be given by referring also to FIG. 1. Moreover, in FIG. 4, the same processing as that of FIG. 3 is assigned with the same reference numeral, and description thereof will be omitted according to necessity. In the cellular 100A of this variation, in a state in which, for example, the application program of the navigation system is activated and the tracking processing is in execution (step S202), when the user initiates an application of an attached camera, not shown, to shoot a still or mobile picture (Y in step S301), a warning "After predetermined period of time, navigation is stopped" is presented on the display module 107 (step 5302) and the timer 108 is started (step S206). The warning display may be dispensed with. Or, while the timer 108 is measuring time, the warning display may be presented.

In the first variation, when the application program of the camera is initiated, the display of the image for the shooting and the display of the map and the longitude and the latitude conflict with each other on the display 107; therefore, unless the user terminates the application program of the camera within a predetermined period of time, the position measurement by the application program of the navigation system is suspended and power supply to the position measurement processing module 105 is also stopped (step S209).

On the other hand, when the user mistakenly pushes a button (not shown) to activate the application program of the camera, the user recognizes the operation error according to the warning display (step S302) and suspends the activation of the application program of the camera. Therefore, if the cancellation is conducted within a predetermined period of time (N in step S207), the application program of the navigation system is in execution; and hence the tracking processing is continuously executed (step S202).

In the description of the first variation, in a situation wherein the application program of the navigation system is activated, if a second application program is initiated, the timer 108 always starts the time measuring operation; however, this may be limited to a case wherein there appears a state in which the display operations conflict with each other on the display module 107 and the user does not utilize the position measurement result. However, in this situation, the operation is applicable within the range of control described in conjunction with FIG. 3.

<Second Variation of the Invention>

Figure 5:
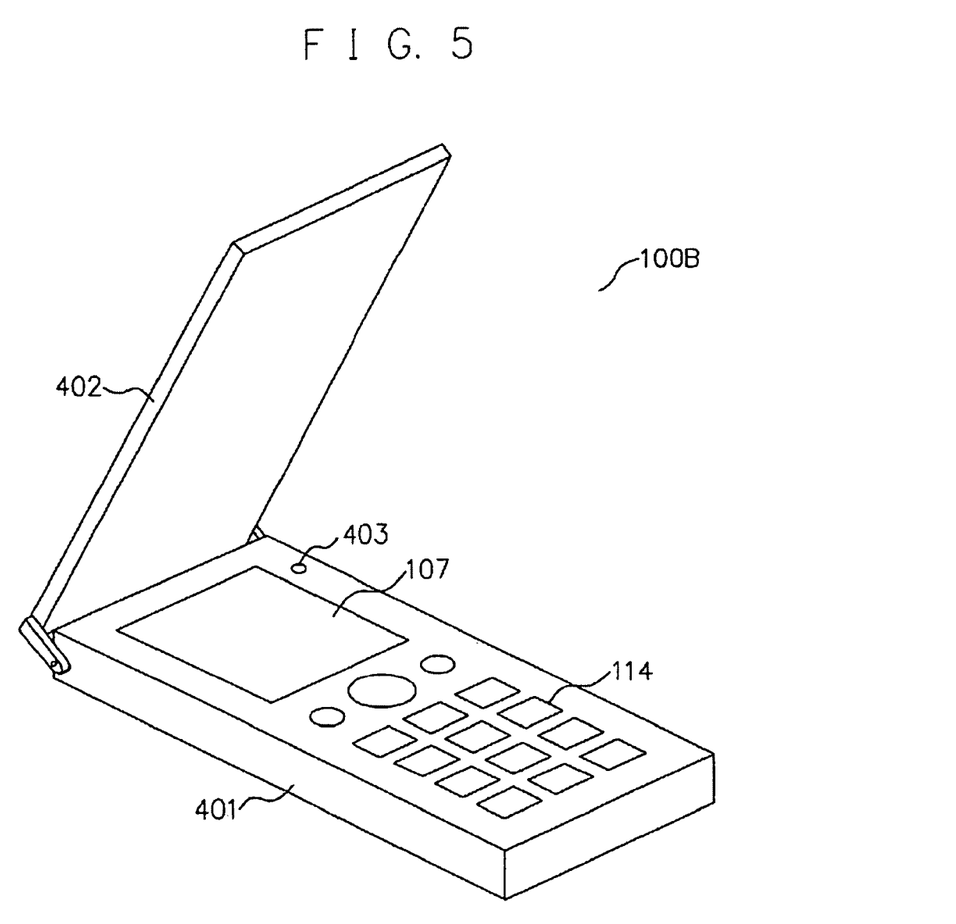
FIG. 5 is a perspective view showing an appearance of the cellular in a second variation of the present invention.

FIG. 5 shows an outer appearance of the cellular in a second variation of the invention. In the cellular 100B of the second variation, a display module 107 and an operation module 114 are disposed on one and the same housing 401, and there is disposed a cover 402 to protect the housing 401 so that the cover 402 can be opened and closed. In the cellular 100B, in a state wherein the cover 402 is closed to cover the display 107 and the operation module 114, a projection 403 projecting in a neighborhood of the display 107 is depressed, and then a cover detection switch, not shown, disposed in the housing 401 detects the closed state.

When the state in which the cover 402 is closed is detected, the timer 108 MG. 1) is activated as described in FIG. 3 in a similar way as in the case in which the folding detection switch 109 shown in FIG. 2 detects the folding of the cellular 100. In this fashion, the present invention is also applicable to other than the folding-type cellular.

Incidentally, in the exemplary embodiment and the first variation, a predetermined reserved period of time is set during a period of time from when the timer 108 is activated to when the position measurement processing is terminated; however, depending on an event occurred, the position measurement processing may be immediately terminated without activating the timer 108. Furthermore, the present invention is applied not only to the cellulars, but it is also natural that the present invention is applicable to various electronic apparatuses such as PHS and PDA capable of executing the position measurement processing.

This application is the National Phase of PCT/JP2007/067683, filed Sep. 11, 2007, which is based upon and claims the benefit of priority from Japanese patent application No. 2006-276359, filed on Oct. 10, 2006, the disclosure of which is incorporated herein in its entirety by reference.

DESCRIPTION OF REFERENCE NUMERALS 100, 100B Cellular
101 CPU
102 Arithmetic processing module
103 Communication control module
105 Position measurement processing module
106 Position measuring antenna
107 Display module
108 Timer
109 Folding detection switch
111 Storage module
112 Power supplying module
113 Power source module
402 Cover
403 Projection

The invention claimed is:

1. An electronic apparatus, comprising:
 a position measuring unit that at least receives signals transmitted from a plurality of satellites moving around the earth and thereby measures a receiving position;
 a particular application program operation control unit that controls operation of a particular application program which conducts predetermined processing by use of a result of the position measurement of the position measuring unit;
 a power supplying unit that supplies power for the processing of the position measurement to the position measuring unit;
 a particular application program use presence or absence judge unit that judges presence or absence of use of the particular application program by a user; and
 a power supply control unit that: (a) suspends supply of power from the power supplying unit to the position measuring unit, when the particular application program use presence or absence judge unit judges absence of the use by the user, and (b) does not suspend supply of power from the power supplying unit to the position measuring unit, when the particular application program use presence or absence judge unit does not judge absence of the use by the user,
 wherein when an application program of a camera is initiated, the particular application program use presence or absence judge unit judges absence of use by the user,
 wherein the power supply control unit comprises a timer for measuring a predetermined period of time from when the application program of the camera is initiated, and suspends supply of power from the power supplying unit to the position measuring unit, when the timer measures a lapse of the predetermined period of time,
 wherein a warning is displayed when the application program of the camera is initiated, the warning indicating the particular application program is stopped after the predetermined period of time.

2. The electronic apparatus in accordance with claim 1, comprising: a first housing including a display module to display the position measurement result, a second housing including an operation module to conduct various operations, and a hinge module to couple the first and second housings with each other so that the first and second housings can be opened and closed, wherein the particular application program use presence or absence judge unit comprises a sensor for detecting an event that the first and second housings are closed, and judges absence of the use by the user when the sensor detects the event.

3. The electronic apparatus in accordance with claim 1, comprising: a display module for displaying the position measurement result and a cover for covering a surface of the display module when the display module is not used for display, wherein the particular application program use presence or absence judge unit comprises a sensor for detecting an event that the cover is closed, and judges absence of the use by the user when the sensor detects the event.

4. The electronic apparatus in accordance with claim 1, wherein the power supply control unit makes the power supplying unit supply power to the position measuring unit only when the particular application program operation control unit is operating the particular application program.

5. The electronic apparatus in accordance with claim 1, wherein if the particular application program use presence or absence judge unit judges presence of the use by the user before the timer measures a lapse of the predetermined period of time, the measured time of the timer is reset.

6. The electronic apparatus in accordance with claim 1, wherein when failure which prevents the position measurement result from being normally displayed occurs during execution of the particular application program, the particular application program use presence or absence judge unit judges absence of the use by the user.

7. A non-transitory computer-readable medium storing a power supply control program for position measuring, wherein the program causes a computer of an electronic apparatus which comprises a position measuring unit that at least receives signals transmitted from a plurality of satellites moving around the earth and thereby measures a receiving position and which executes a particular application program by use of a result of the position measurement of the position measuring unit to thereby conduct predetermined processing to executes:
 particular application program use presence or absence judge processing of judging presence or absence of use of the particular application program by a user; and
 power supply control processing of: (a) suspending supply of power to the position measuring unit, when the particular application program use presence or absence judge unit judges absence of the use by the user, and (b) not suspending supply of power to the position measuring unit, when the particular application program use presence or absence judge unit does not judge absence of the use by the user, wherein when an application program of a camera is initiated, the particular application program use presence or absence judge processing judges absence of use by the user, wherein the power supply control processing comprising: continuation judge processing of judging presence or absence of the use by the user continuously for a predetermined period of time after when the application program of the camera is initiated; power suspension processing for suspending the supply of power to the position measuring unit when the continuation judge processing judges absence of the use by the user continuously for the predetermined period of time; and power continuous supply processing for supplying power to the position measuring unit for the predetermined period of time at least from the time when the continuation judge processing judges presence of the use by the user before a lapse of the predetermined period of time, wherein a warning is displayed when the application program of the camera is initiated, the warning indicating the particular application program is stopped after the predetermined period of time.

8. An electronic apparatus, comprising:

position measuring means for at least receiving signals transmitted from a plurality of satellites moving around the earth and thereby measuring a receiving position;

particular application program operation control means for controlling operation of a particular application program which conducts predetermined processing by use of a result of the position measurement of the position measuring means;

power supplying means for supplying power for the processing of the position measurement to the position measuring means;

particular application program use presence or absence judge means for judging presence or absence of use of the particular application program by a user; and power supply control means for: (a) suspending supply of power from the power supplying means to the position measuring means, when the particular application program use presence or absence judge means judges absence of the use by the user, and (b) not suspending supply of power from the power supplying means to the position measuring means, when the particular application program use presence or absence judge means does not judge absence of the use by the user, wherein when an application program of a camera is initiated, the particular application program use presence or absence judge means judges absence of use by the user, wherein the power supply control means comprises a timer for measuring a predetermined period of time from when the application program of the camera is initiated, and suspends supply of power from the power supplying means to the position measuring means, when the timer measures a lapse of the predetermined period of time, wherein a warning is displayed when the application program of the camera is initiated, the warning indicating the particular application program is stopped after the predetermined period of time.

* * * * *